US008990062B2

(12) United States Patent
Kawahara

(10) Patent No.: US 8,990,062 B2
(45) Date of Patent: Mar. 24, 2015

(54) METHOD AND PROGRAM FOR ESTIMATING OPERATION OF PROGRAM

(75) Inventor: Ryo Kawahara, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 13/233,165

(22) Filed: Sep. 15, 2011

(65) Prior Publication Data

US 2012/0072199 A1 Mar. 22, 2012

(30) Foreign Application Priority Data

Sep. 22, 2010 (JP) .................................. 2010-212079
Mar. 23, 2011 (JP) .................................. 2011-063882

(51) Int. Cl.
| | | |
|---|---|---|
| G06F 17/50 | (2006.01) | |
| G06G 7/62 | (2006.01) | |
| G06F 9/45 | (2006.01) | |
| G06F 9/44 | (2006.01) | |
| G06F 13/10 | (2006.01) | |
| G06F 13/12 | (2006.01) | |
| G06F 11/34 | (2006.01) | |
| G06F 11/22 | (2006.01) | |
| G06Q 10/06 | (2012.01) | |
| G06F 12/16 | (2006.01) | |
| G06F 9/455 | (2006.01) | |
| G06F 11/36 | (2006.01) | |

(52) U.S. Cl.
CPC ........ *G06F 11/3457* (2013.01); *G06F 11/2273* (2013.01); *G06Q 10/0637* (2013.01); *G06F 12/16* (2013.01); *G06F 9/455* (2013.01); *G06F 11/3612* (2013.01)
USPC ................. 703/21; 703/14; 703/17; 703/22

(58) Field of Classification Search
CPC ..... G06F 11/2273; G06F 12/16; G06F 9/455; G06Q 10/0637
USPC .......................................... 703/21, 14, 17, 22
See application file for complete search history.

(56) References Cited

U.S. PATENT DOCUMENTS

2010/0332721 A1* 12/2010 Yamada et al. ................... 711/6

FOREIGN PATENT DOCUMENTS

| JP | 63259740 A | 10/1988 |
| JP | 05-158740 A | 6/1993 |

(Continued)

OTHER PUBLICATIONS

Thin-Fong, Tsuei, NPL, "A multiprocessor Bus Design Model Validated by System Measurement", IEEE, 1992.*
T. N. Mudge, NPL, "Analysis of Multiple-Bus Interconnection Networks", 1986.*

(Continued)

*Primary Examiner* — Omar Fernandez Rivas
*Assistant Examiner* — Angel Calle
(74) *Attorney, Agent, or Firm* — Jeff Tang

(57) ABSTRACT

The present invention is achieved as software which operates on a computer system and which performs calculation by receiving various data as inputs, and which outputs values. The present invention is applicable to a coarse-grained system architecture model including the foregoing event-driven simulation and receives, as inputs, execution time T and the number of memory accesses, N, in the simulation step of the model. Thus, various estimates at the occurrence of memory access conflict are obtained at a simulation speed sufficient for evaluating the effect of the memory access conflict and comparing it with many alternative architectures without information on the correct timing of memory accesses in consideration of memory synchronous accesses and arbitration. The results of this simulation are estimated simulation-step execution time T' under memory access conflict and memory-bandwidth utilization factors $\{U'_{ij}\}$ in individual simulation steps under memory access conflict.

7 Claims, 13 Drawing Sheets

(56) References Cited

FOREIGN PATENT DOCUMENTS

| | | |
|---|---|---|
| JP | 08339388 A | 12/1996 |
| JP | 2003015965 A | 1/2003 |
| JP | 2007102509 A | 4/2007 |
| JP | 2010286892 | 12/2010 |

OTHER PUBLICATIONS

Sudipta Chattopadhyay, NPL, "Modeling Shared Cache and Bus in Multi-cores for Timing analysis", Jun. 2010.*

Mudge, et al., Analysis of Multiple-Bus Interconnection Networks, Journal of Parallel and Distributed Computing, 1986, 3, 328-343.

* cited by examiner

FIG. 1
(a)
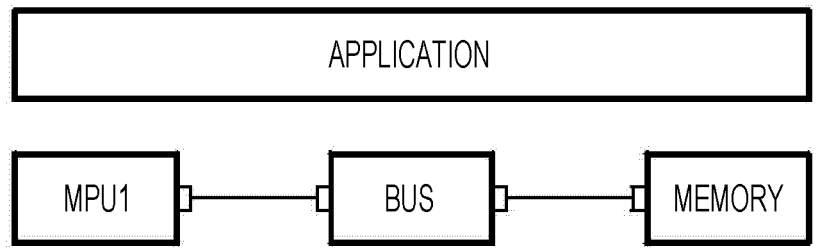
(b)
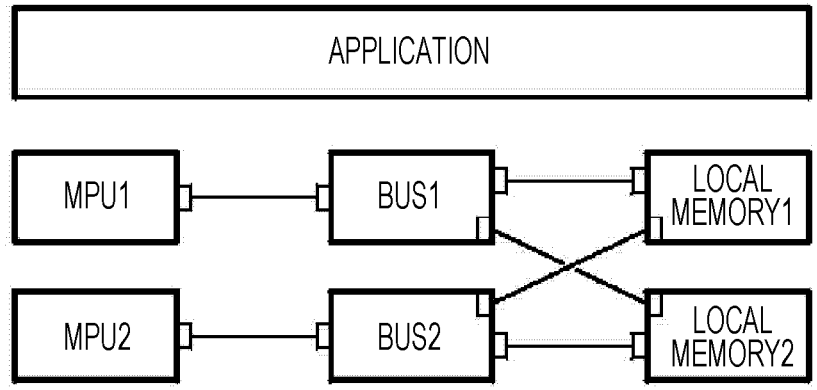
(c)
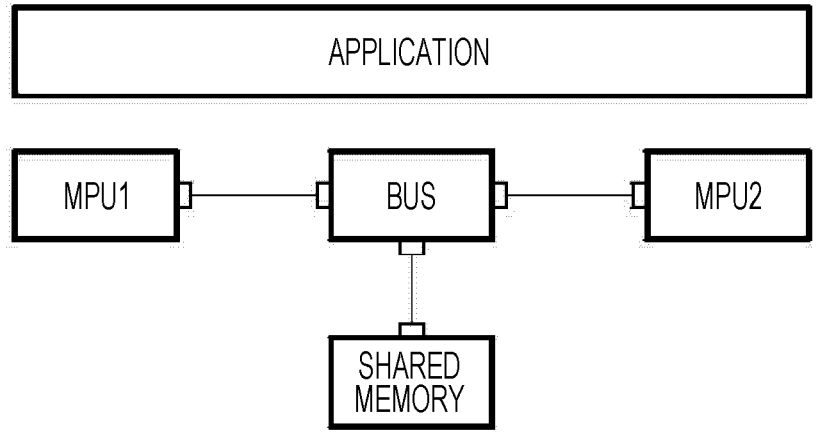

FIG. 2
(a)
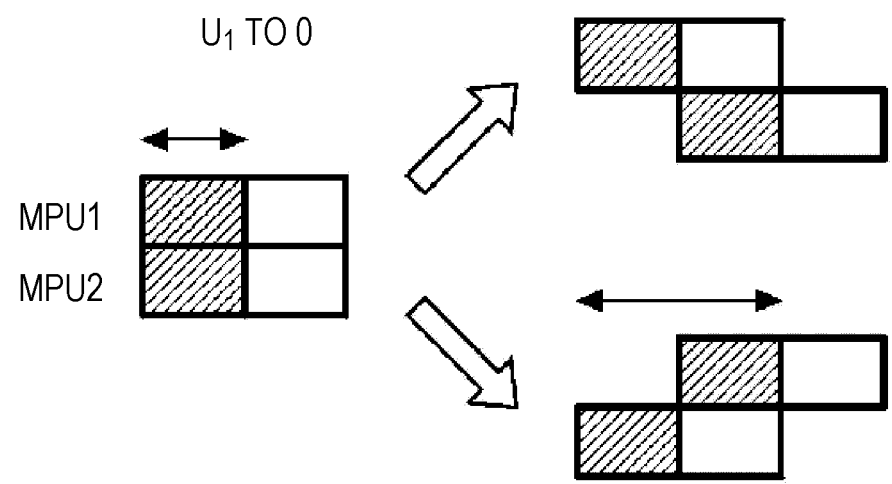
$U_1$ TO 0
(b)
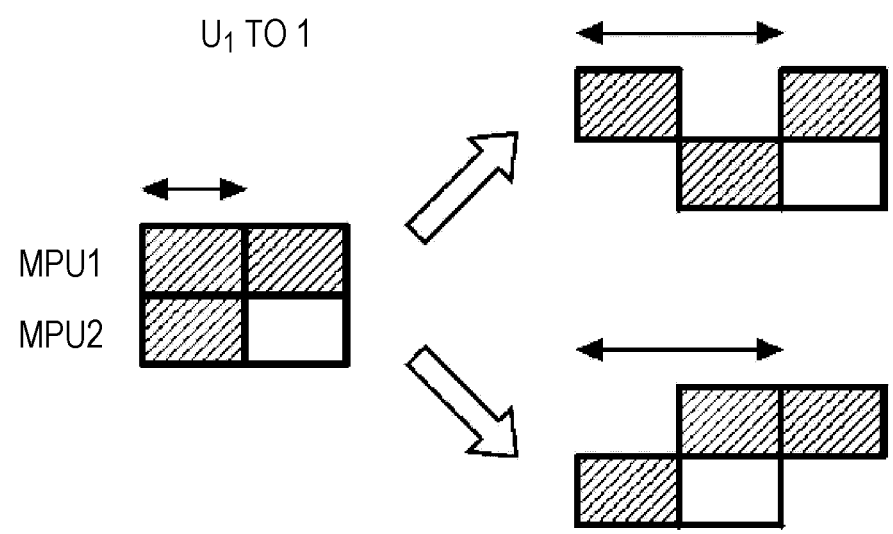
$U_1$ TO 1

METHOD AND PROGRAM FOR ESTIMATING OPERATION OF PROGRAM

CROSS-REFERENCE TO RELATED APPLICATION

This application claims priority under 35 U.S.C. §119 from Japanese Patent Application No. 2011-063882, filed Mar. 23, 2011, which in turn claims priority from Japanese Patent Application No. 2010-212079, filed Sep. 22, 2010, the entire contents of both applications are incorporated herein by reference.

BACKGROUND OF THE INVENTION

1. Field of the Invention

The present invention relates to an operation estimation technique for a program expressed in a simulation model, and more particularly, to a method and an article of manufacture for estimating a memory access conflict.

2. Description of Related Art

In recent years, modeling and simulation using MATLAB®/Simulink®, the Unified Modeling Language (UML), the Systems Modeling Language (SysML) or the like are frequently performed in the design process of embedded system program development.

On the other hand, developed programs are executed by hardware in predetermined computers, and performances are tested. Since multicore CPUs are recently coming into common use, the need to simulate computers having a multicore CPU is increasing also in consideration of an improvement in speed due to parallel execution.

However, in computers having a multicore CPU, individual cores access a memory via buses, which causes the problem of memory access conflict, which exerts an influence on program execution time.

Design flexibility is remarkably high at the early developing stage of embedded system design. For example, there are 216 patterns for assigning three software components to two cores and three memory areas, and thus, it is important to exclude inappropriate combinations at rough measurement before entering a detailed design stage.

However, existing performance evaluation methods are not suitable for measuring memory access conflict at a system architecture design phase.

For example, it is so difficult for an abstract mathematic technique, such as a queuing network model, to describe the behavior of an application, such as state transition that it cannot generate execution time per execution, and thus, it is used mainly for a statistical purpose.

Another technique, such as a fine-grained step simulation technique, for example, SystemC and an instruction set simulator (ISS), needs accurate memory access timing, and thus has the problems of high cost to collect such data at an early design stage and taking too much time for simulation.

A yet another technique uses an instruction level trace. However, with this technique, measurement itself interferes with the system performance. In addition to this, enormous time needed for simulation.

Japanese Unexamined Patent Application Publication No. 8-339388 discloses a logical simulation method in a multiprocessor system, and in particular, to a method for accessing the same memory area from individual processors, in which a logical simulation and a software simulation are simultaneously operated, and the result of the logical simulation and the result of the software simulation are compared at any timing, where processor-specific read and write areas and a shared write area for all the processors are provided. A read instruction is used for a processor to read from the processor-specific read and write areas, and a write instruction is used for a processor to write to the processor-specific read and write areas and to the shared write area for all the processors so that processor conflict testing is performed using the writing from the individual processors to the write area shared by all the processors.

An object of Japanese Unexamined Patent Application Publication No. 2003-15965 is to provide a test method for automatically generating, in a symmetric multiprocessor that shares a memory, an instruction sequence for generating accesses to the memory at the same timing from a plurality of processors. It discloses a test program including a test-environment setting process, an instruction simulator for generating an expected value, a process of generating an execution trace of test instruction sequence, a result comparing process, a test-instruction-coverage-information storing process, and a test-instruction-sequence generating process, in which test instruction sequences are generated in parallel for the individual processors; the kinds, addresses, and the estimated numbers of executed instruction cycles of issued memory accesses are stored in coverage information. The coverage information is referred to when an instruction is generated from another processor. Test instructions corresponding to the number of the generated execution instruction cycles of the processor are selected, and a test instruction sequence in which accesses to a memory having the same address from the plurality of processors conflict is generated.

Japanese Unexamined Patent Application Publication No. 2007-102509 relates to an arbiter capable of reducing the latency of a bus master, in which when an interface receives a reservation request for accessing a memory of a second bus master from a first bus master, and when a control unit detects that the result of subtracting the bus band of a data bus that is currently used by a bus master of which the access reservation request is most recently permitted from the bus band of a data bus that is currently used by the second bus master is larger than the result of subtracting a bus band corresponding to the data bus reserved by the most recently permitted bus master from the maximum bus band of the data bus, an access reservation request from a bus master other than a bus master for which an access request has already been permitted is not permitted.

Mudge, T. N., Hayes, J. P., Buzzard, G. D. & Winsor, D.C. "Analysis of Multiple-Bus Interconnection Networks", Journal of Parallel and Distributed Computing, 1986, 3, 328-343 discloses approximation in which memory accesses are at random, uniform, and independent among processors, and solving an algebraic equation for calculating a bandwidth utilization factor $U^*$ including both a new memory access and latency (retransmission) due to bus arbitration using a simple iteration method. However, the technology disclosed in this literature can be used for analyzing the entire memory bandwidth on a symmetric multiprocessor system but cannot be used either on a heterogeneous multiprocessor system or for analyzing a memory bandwidth at an application level.

SUMMARY OF THE INVENTION

The foregoing conventional techniques are not sufficient in terms of the coverage of a memory access pattern tested, the cost for preparing data for measurement, and the enormous volume of calculation for estimating execution speed on the basis of simulation results.

Accordingly, it is an object of the present invention to provide a technique for allowing calculation of the probability of memory access conflict at sufficient abstraction level and a suitable calculation amount for modeling an application without the need for a detailed memory access pattern.

It is another object of the present invention to provide a technique for estimating a program execution time resulting from memory access conflict on the basis of the thus-calculated probability of memory access conflict.

The present invention solves the above problems and provides an estimation technique for obtaining a step execution time estimate by expressing an application-level behavior using an event-driven simulation and statistically approximating finer-grained memory access timings.

One aspect of the present invention provides a method for evaluating a probability of memory access conflict of bus masters while a program expressed in a simulation model is in operation, in a system in which the bus masters including a processor, an accelerator, and a controller can access a memory, the method including the steps of: measuring, for the simulation model, an execution time and a number of memory accesses for each simulation step for each of the different bus masters or preparing measurement values in advance; calculating an utilization factor of a memory bandwidth for each of the different bus masters using the values of the execution time and the number of memory accesses; and calculating the probability of memory access conflict among the different bus masters using a formula including the product of the utilization factors of the memory bandwidths of the different bus masters.

Another aspect of the present invention provides a computer readable article of manufacture tangibly embodying non-transitory computer readable instructions which, when executed, cause a computer to carry out the steps of a method for evaluating a probability of memory access conflict of bus masters while a program expressed in a simulation model is in operation, in a system in which the bus masters including a processor, an accelerator, and a controller can access a memory, the method including the steps of: measuring, for the simulation model, the execution time and the number of memory accesses for each simulation step for each of the different bus masters or preparing measurement values in advance; calculating an utilization factor of a memory bandwidth for each of the different bus masters using the values of execution time and the number of memory accesses; and calculating the probability of memory access conflict among the different bus masters using a formula including the product of the utilization factors of the memory bandwidths of the different bus masters.

BRIEF DESCRIPTION OF THE DRAWINGS

The invention and its preferred embodiments, additional objects, features and advantages will be better understood by referring to the detailed description of the exemplary embodiments when read in conjunction with the attached drawings, in which:

FIG. 1 is a diagram showing examples of different hardware architectures.

FIG. 2 is a diagram showing the U dependency of latency times in two processors in round robin arbitration.

DETAILED DESCRIPTION OF THE PREFERRED EMBODIMENTS

Figure 3:
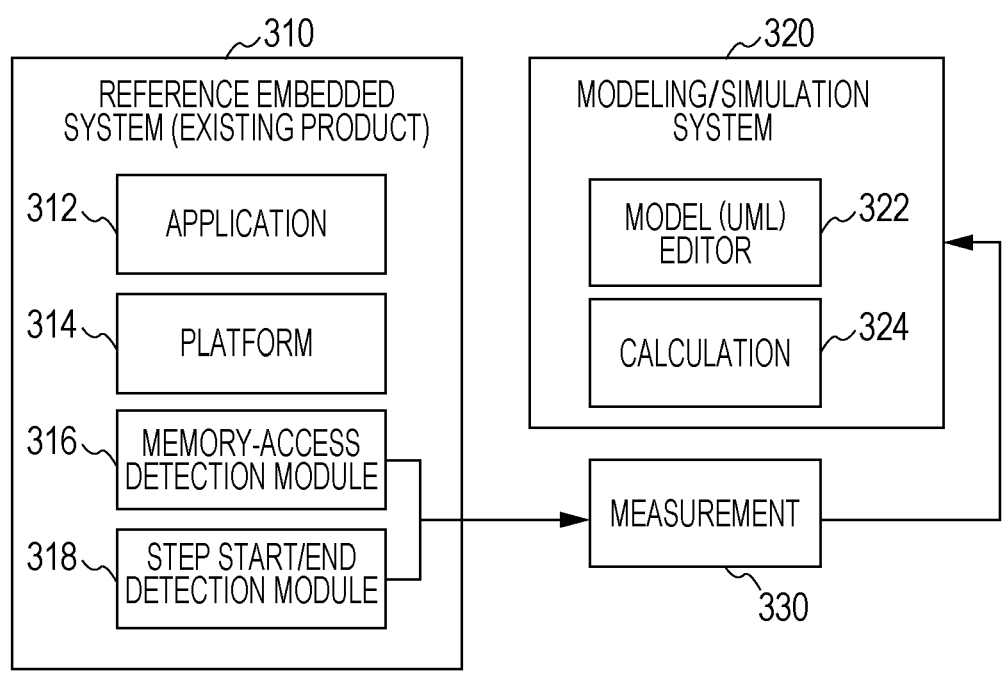
FIG. 3 is a block diagram showing, in outline, an overall system for estimating the performance of a program to be developed.

The present invention is achieved as software which operates on a computer system and which performs calculation by receiving various data as inputs and which outputs values.

The present invention is applicable to a coarse-grained system architecture model including the foregoing event-driven simulation and receives, as inputs, execution time T and the number of memory accesses, N, in the simulation step of the model.

Thus, various estimates at the occurrence of memory access conflict are obtained at a simulation speed sufficient for evaluating or estimating the effect of the memory access conflict and comparing it with the results of many alternative architectures without information on the correct timing of memory accesses in consideration of memory synchronous accesses and arbitration.

The results of this simulation are estimated simulation-step execution time T' under memory access conflict and memory-bandwidth utilization factors $\{U'_i\}$ in individual simulation steps under memory access conflict.

The above will be more strictly described using equations as follows. First, the utilization factor of a memory bandwidth is expressed as follows:

$$U = (N/T)/W$$

where W it the maximum number of memory accesses available for a shared memory each unit time. When the reading speed and the writing speed of the memory access differ, the utilization factor U can be more accurately calculated using the formula, $U = Nr/T/Wr + Nw/T/Ww$, where Nr is the number of times of memory reading, Nw is the number of times of memory writing, Wr is the maximum number of available read accesses per unit time, and Ww is the maximum number of available write accesses per unit time.

$$P_c = P_c(U_1, \ldots, U_M)$$

where, c is the index of a collision pattern. If there are M processors, there are $2^M$ patterns.

$U_i$ is the memory bandwidth utilization factor of a step running on the $i^{th}$ processor.

Assuming that N>>1, the execution time T∝$_i$ of one step due to the effect of memory access conflict is evaluated from Pc using the following equation.

[Formula 1]

$$\frac{T'_i}{T_i} = 1 + \sum_c^{2^M} (A_{c,i} - 1) P_c \quad (1)$$

where $A_{c,i}$ is the ratio of the latency of a memory access from the $i^{th}$ processor in the collision pattern c to the latency of a memory access from the $i^{th}$ processor under no collision.

A memory bandwidth utilization factor $U'_i$ under memory access conflict is evaluated using the following equation:

$$(U'_i / U_i) = (T_i / T'_i)$$

According to the present invention, since suitable amount of execution time and memory access conflict can be obtained using execution time T and the number of memory accesses, N, as inputs, mainly in a model simulation step, a suitable architecture can be rapidly determined from various architectures even in a coarse stage of design model by estimating the execution time and the memory bandwidth utilization factor.

Before embodiments of the present invention are described, why design space exploration for embedded systems cannot be performed well only by using an instruction set simulator (ISS) will be described.

Embedded systems need to design both hardware and software. Therefore, as the components of the hardware and software increase, the number of alternative architectures to be considered also increases exponentially. In embedded systems, the product performance depends on the application specific integrated circuit (ASIC) and the system-on-chip (SoC).

On the other hand, embedded systems have many constrains, such as a manufacturing cost and power consumption.

For example, assume that there are 216 alternative architectures for assigning three software components to two cores and three memory areas.

Assume that it takes one minute for a test of one product.

Assume that there are 100 test patterns.

Assume that the ISS runs at a speed 100 times as low as the original system.

Assume that the host processor is 10 times as fast as a target processor.

Then, it takes 216×1×100×100/(10×60×24)=150 days for simulation.

However, the simulation time can be reduced by parallelization.

Furthermore, the software code and the hardware model must be rewritten 216 times in accordance with the alternate architectures because software is designed particularly to access hardware.

Accordingly, it is important to prune the design space by a lightweight processing technique. The ISS can be used to obtain a more accurate estimate after pruning.

Under such understanding, the present invention is a technology that allows rapid estimation of a difference in performance when an executable program, typically created using a tool for creating a design model, such as a UML model, is operated by hardware with different architectures.

The different architectures in this case are the number of cores and the topology of memory arrangement in a multicore CPU. FIGS. 1(a) to 1(c) show examples of different architectures. In the following embodiments, they are also referred to as platforms.

The first assumption is that a program that is run with different architectures should be formed of the same instruction set and compiler option. This is because the execution time of an obtained step significantly differs if the architectures have different instruction sets.

The next assumption is that a reference architecture and the other architectures should have the same cache miss rate. This can be appropriate when a coarse-grained model is used, and the cache architecture is not changed. This is because a cache uses the locality of an access, while the locality of an access comes from the local configuration of the program (for example, loop). Of course, this is not applicable when a cache configuration, such as a cache size or a cache method, is changed. This causes the need for adjusting the cache miss rate by an additional experiment or simulation.

The next assumption is that most memory accesses have memory stall. This assumption is appropriate although out-of-order execution and prefetching reduce memory stall. This is because recent computer systems have a large gap between processor speed and memory latency (100 cycles or more). If this assumption is not correct, this shows that the technique of the present invention estimates the time excessively.

The next assumption is that the throughputs of memory accesses should be constant. This is approximately correct if the addresses accessed are random addresses. However, for sequential accesses, this is not correct because the DRAM tends to achieve higher throughput. This can be coped with by using different values of throughput for continuous accesses and random accesses.

Next, acquisition of performance parameters (T and N) necessary for embodying the present invention will be described.

(1) Measuring Existing System

An application-profile collection tool can measure execution time and the number of memory accesses while exerting little disturbance on the system performance if an application-profile collection tool and an in-circuit-cache evaluation system which supports logging in external hardware are used. This is the most cost efficient and accurate method because most new systems are modifications of an existing system.

(2) Analyzing Design Specifications of Existing System

The number of memory accesses from ASIC and SoC components cannot be normally measured. This is because ASIC and SoC components are hardware to which an application-profile collection tool or the like is not connected. Since ASIC and SoC components have no cache memory, the number of memory accesses can also be estimated from specifications on algorisms and data sizes described in design documents to evaluate the memory accesses of the ASIC and SoC components.

(3) If a Fairly New Component is Added to a New System, Measurement is Impossible.

This is appropriate if a platform is present, and only software is new, it is appropriate to prototype the software component and perform a measurement using the application-profile collection tool.

(4) Partial Prototyping on Virtual Platform

If both the platform and software of a new component are not available, parameters are estimated by a fine-grained simulation, such as ISS, SystemC, or HDL of the prototype. This costs relatively higher than the foregoing methods. However, it can be said that this is still reasonable in terms of cost as a whole because design space exploration is performed using the lightweight method for the present invention. Anyway, the ratio of new components is not high in many cases.

Next, the theoretical basis of calculation according to the present invention will be described. First, collision probability P for M processors is calculated using the following equation:

[Formula 2]

$$P_c(U_1, \ldots, U_M) = \prod_{q=1}^{M} (1-U_q)^{n(q,c)}(U_q)^{b(q,c)} \quad (2)$$

where a collision pattern index c is expressed as a nonnegative integer, c=0, 1, 2, ..., $2^M-1$. If c is an M-digit binary number, the function b(q, c) returns 1 when the $q^{th}$ bit of c is 1, and returns 0 otherwise. n(q, c) is 1−b(q, c).

Eq. (2) does not count collisions between previous accesses and a new access during which completion of the other accesses is waited for. This effect makes actual collision probability higher than that expressed by Eq. (2).

Thus, the following value is introduced to take account of this effect.

[Formula 3]

$$U^* = \frac{(T'-T)+TU}{T'} \quad (3)$$

The numerator of this formula is the sum of a memory processing time (TU) processed by a memory subsystem and process latency T'−T.

Thus, $U_q$ in Eq. (1) is replaced with $U^*_q$ exclusive of q=i as follows:

[Formula 4]

$$P_c(U_1^*, \ldots, U_{i-1}^*, U_i, U_{i+1}^*, \ldots, U_M^*) = \quad (4)$$
$$(1-U_i)^{n(i,c)}(U_i)^{b(i,c)} \prod_{q=1, q \neq i}^{M} (1-U_q^*)^{n(q,c)}(U_q^*)^{b(q,c)}$$

If Eq. (4) is used, the foregoing Eq. (1) is an algebraic equation of $T'_i$ because $U^*_q$ depends on $T'_i$.

This is solved by making substitutions in sequence. Specifically, $U^*_q = U_q$ is substituted as an initial value into the right side of Eq. (4), and $U^*_q$ is updated using Eq. (3) and the following Eq. (5). This procedure is repeated until the value is converged. Eq. (1) is the same as the above.

[Formula 5]

$$\frac{T'_i}{T_i} = 1 + \sum_{c}^{2^M} (A_{c,i}-1)P_c \quad (1)$$

[Formula 6]

$$\frac{U'_i}{U_i} = \frac{T_i}{T'_i} \quad (5)$$

FIG. 2 is a diagram showing the U dependency of latency times in two processors. In round robin arbitration of accesses from two processors, there are two cases: a case where the accesses are instantly completed (A=1, upward arrow); and a case where the accesses delay (A=2, downward arrow), as shown in FIG. 2(a). If the next cycle after collision is not a memory access, the processors are immediately restarted in either case. Since both cases occur at equal probability, the latency ratio is estimated from A=1×(1/2)+2×(1/2)=3/2.

On the other hand, for two processors 1 and 2, the arbiter processes simultaneous memory accesses in a predetermined order, such as 1, 2, 1, 2, . . . . If the next cycle after conflict is a memory access, the access has no chance of being processed after an access from the other processor is completed.

Thus, in this case, the latency ratio tends to increase (A=2), as shown in FIG. 2(b).

Thus, an expected value of latency time A is expressed as follows:

[Formula 7]

$$A = 2U_i + \frac{3}{2}(1-U_i) \quad (6)$$

This equation can be generalized for M processors by equal arbitration. This effect extends to the $m(c)^{th}$ continuous cycle. In the case where the processors are involved in collision in a collision pattern c, that is, when b(i, c)=1,

[Formula 8]

$$A_{c,i}(U_i) = \sum_{n=0}^{m(c)-2} E_n r_n(U_i) + E_{m(c)-1}(1-U_i)^{m(c)-1} \quad (7)$$

otherwise, that is, when b(i, c)=0, $A_{c,i}(U_i)=1$ holds. For $U_i$ in Eq. (7), the initial value $U_i$ is used. Here,

[Formula 9]

$$m(c) = \sum_{q}^{M} b(q, c) \quad (8)$$

$$r_n(U) = (1-U)^n U \quad (9)$$

$$E_n = (m(c)-n)\frac{m(c)-n-1}{m(C)} + (n+1)\frac{2m(c)-n}{2m(c)} \quad (10)$$

hold.

FIG. 3 is a block diagram showing a function for performing the process of the present invention. The system in FIG. 3 includes a reference embedded system 310, a modeling/simulation system 320, and a measurement system 330. In the reference embedded system 310, an architecture 302 is, for example, a hardware architecture for implementing the embedded system, examples of which are shown in FIG. 1.

In the reference embedded system 310, an application 312 is an executable program whose operation is to be tested. A platform 314 is hardware for operating the application 312, examples of which are shown in FIG. 1. A memory-access detection module 316 detects an access of the application 312 to the memory of the platform 314. A step start/end detection module 318 detects the start/end of step $T_{step}$ in FIG. 8, to be described later.

The modeling/simulation system 320 is preferably a UML-based simulation system and includes a model (UML) editor 322 and a calculation module 324. The calculation module 324 estimates execution time, a memory bandwidth utilization factor, and other values in accordance with the algorithm described above.

The measurement module 330 operates to make data which is detected by the memory-access detection module 316 and which is split into steps having starts and ends by the step start/end detection module 318 into the form of execution trace and to transfer it to the modeling/simulation system 320.

The calculation module 324 estimates execution time, a memory bandwidth utilization factor, and other values in accordance with the algorithm described above using the data transferred from the measurement module 330.

Next, before the process of the calculation module 324 will be described with reference to the flowchart in FIG. 4, definitions and preconditions will be given.

DEFINITIONS

Collision is simultaneous accesses from a plurality of processors.

c is the index of a collision pattern. If there are M processors, there are $2^M$ patterns.

$P_c$ is the probability of collision in a pattern c.

$U_i$ is the memory bandwidth utilization factor of a step running on the $i^{th}$ processor.

$A_{c,i}$ is the ratio of the latency of a memory access from the $i^{th}$ processor in the collision pattern c to the latency of a memory access from the $i^{th}$ processor under no collision.

Preconditions:

M steps run in parallel.

$\{U_i\}$ is calculated using $U_i = (Nr_i/T_i)/Wr + (Nw_i/T_i/Ww$, where W is throughput, $Nr_i$ is the number of times of memory reading, $Nw_i$ is the number of times of memory writing, Wr is the maximum number of available read accesses per unit time, and Ww is the maximum number of available write accesses per unit time.

$\{A_{c,i}\}$ is calculated using Eqs. (7), (8), and (9).

In step 402, the calculation module 324 performs initialization using $U^*_i = U_i$, $U^*_i[0] = U_i$, n:=0.

In step 404, the calculation module 324 increases n using n:=n+1.

In step 406, the calculation module 324 calculates $P_c(\{U^*_i = U_i\})$ using Eq. (4).

In step 408, the calculation module 324 calculates $T'_i/T_i$ using Eq. (1).

In step 410, the calculation module 324 calculates $U'_i[n]$ using Eq. (5).

In step 412, the calculation module 324 determines whether $|U'_i[n] - U'_i[n-1]| < \epsilon$, where $\epsilon$ is a predetermined small positive constant, which is used for determination of convergence. When $|U'_i[n] - U'_i[n-1]| < \epsilon$ is satisfied, the calculation module 324 determines that the calculation has converged and outputs $P_c$ to terminate the calculation process in step 414.

If $|U'_i[n] - U'_i[n-1]| < \epsilon$ has not yet been satisfied, the calculation module 324 calculates $U^*_i$ using Eq. (3) in step 416 and returns to step 404.

When it is determined that the calculation has converged in step 412 through the loop of steps 404, 406, 408, 410, 412, and 416, the individual execution times $T'_i$ are obtained at the stage of completion of the calculation. Calculation of the execution times of the entire application requires the process of executing the steps in accordance with the semantic of the UML and adding $T'_i$ each time.

Assuming that the number of processors is M, this calculation amounts to about $O(M^2 \cdot 2^M)$.

The maximum number of simultaneous accesses is M, and the number of times of convergence is found to be O(M) by experiment. The number of collision patterns per case is $2^M$.

Simulation speed does not depend on the number of memory accesses.

A simulation by this method when N is large runs at a higher speed than that by a fine-grained method. This is because the amount of calculation of a fine-grained method is proportional to N.

The method is unfavorable when the number of processors M connected to a shared memory increases. Such a system significantly deteriorates in performance due to memory access conflict. Therefore, for a system having a large number of processors, a distributed memory architecture is more suitable to reduce the number of conflicts rather than a single shared memory architecture.

Figure 5:
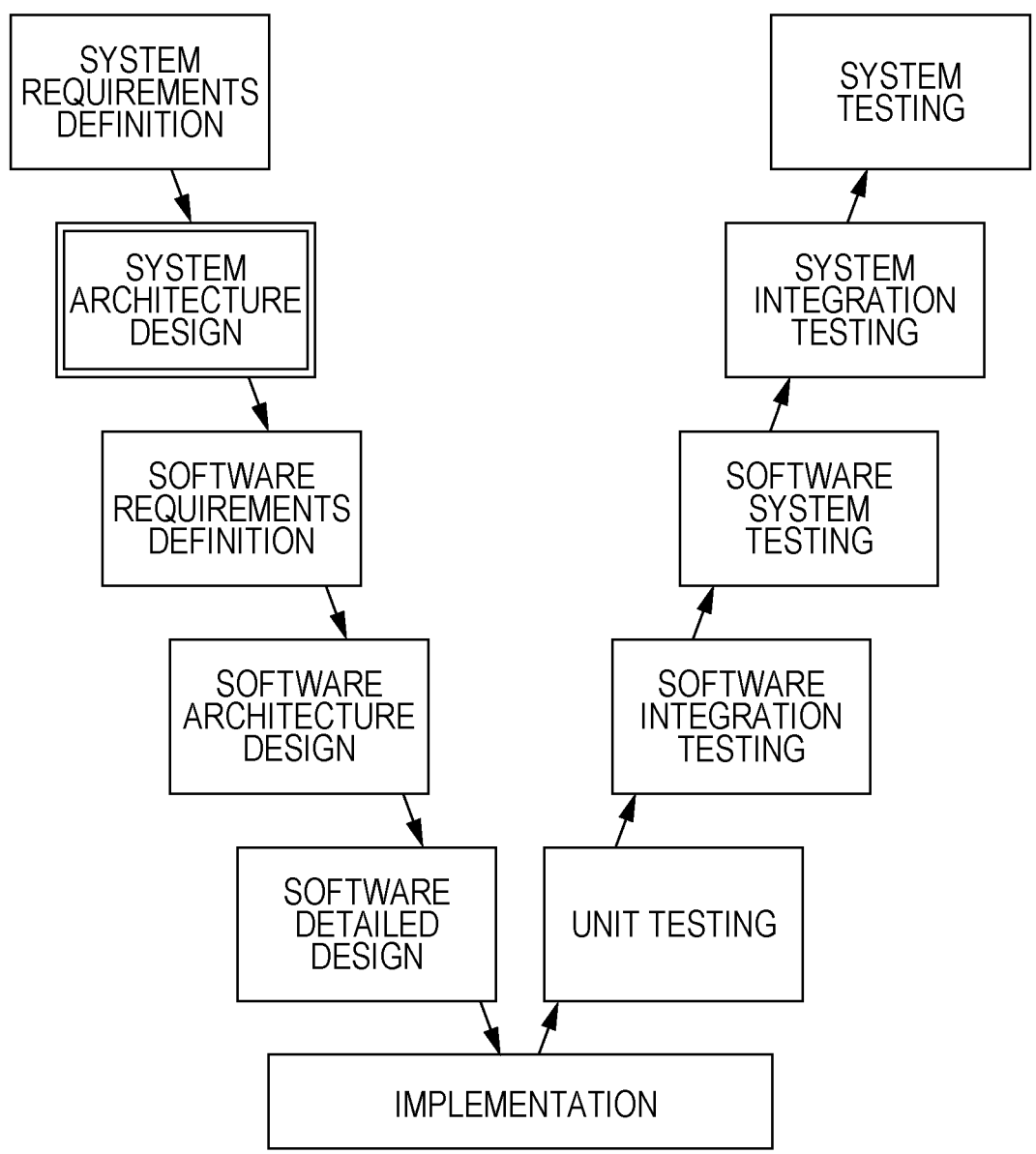
FIG. 5 is a diagram showing a V-model for developing a product.

A specific embodiment in which the present invention is applied to an UML-based design will be described below. First, FIG. 5 shows a V-model of an embedded system.

An early design stage is important for the product performance of a multiprocessor system. This corresponds particularly to system architecture design in the V-model in FIG. 5.

Automated compiler optimization can deal with parallelism at an instruction-set architecture level. Furthermore, the UML is used for software design in which knowledge of an application domain and system architecture are considered as thread-level, higher-level parallelism.

The parallelism makes it difficult to evaluate the performance in the design phase.

In many soft real-time embedded systems, execution time (or response time) is the most important performance index.

An execution trace is a useful tool to analyze system performance, such as execution time. The execution trace includes design-related steps (for example, function call). An execution trace for an existing product is measured at high accuracy. A system for obtaining a measurement module and an execution trace will be described later.

A new product requires a simulation considering the following:

The speeds of individual resources (which can cause a designer to change hardware)

Synchronous transaction for resources (which reduces merits of parallelism)

Resource conflict (which reduces merits of parallelism)

Next, an example of the execution trace will be described. Steps of the execution trace include function call or entry/exit/transition to/from a state.

The execution trace is the history of executed steps. Examples of information included in the execution trace include:

Dependency among the steps

Entry times and exit times of the individual steps

Additional attributes (the number of memory accesses, for example the value of an argument or a thread ID.)

Examples of the execution trace are shown below. Here, only the times when the individual steps' entry and exit are shown, and information on for example the number of memory accesses is omitted.

Figure 6:
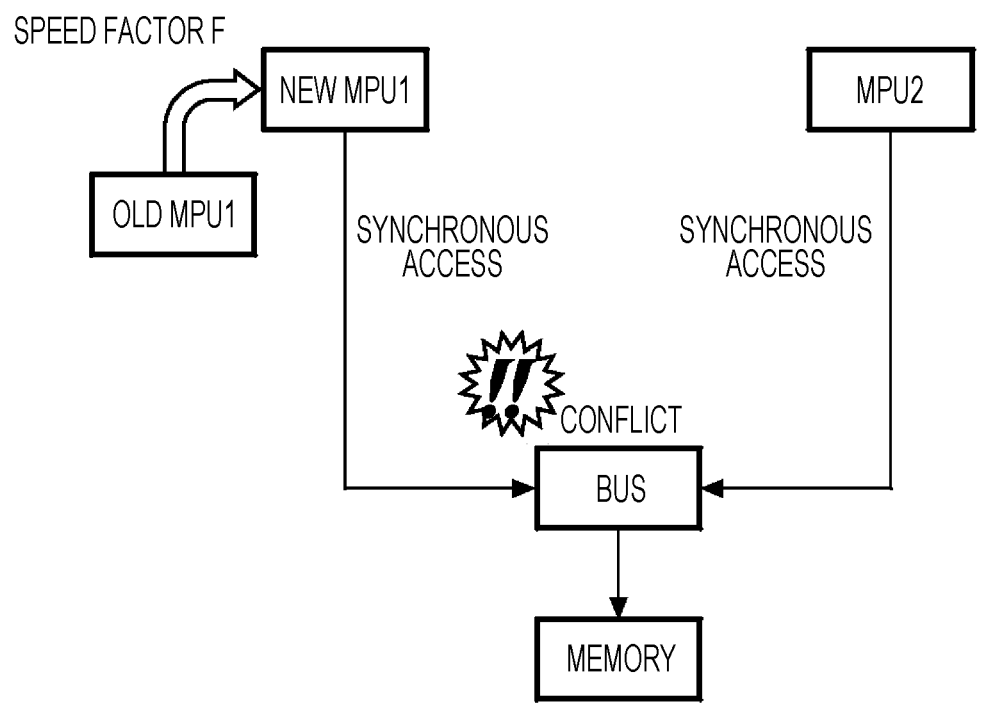
FIG. 6 is a diagram showing a memory access conflict due to accesses of two processors.

Step_a: entry=0120 ms
Step_b: entry=0125 ms
Step_b: exit=0132 ms
Step_c: entry=0132 ms
Step_c: exit=0138 ms
Step_b: entry=0143 ms
Step_b: exit=0150 ms
Step_c: entry=0150 ms
Step_c: exit=0156 ms Step_a: exit=0156 ms FIG. 6 is a schematic diagram showing a memory access conflict. In architecture design, there can be a situation in which a certain processor (old MPU1) is replaced with a new MPU1 having higher speed factor F. However, such a high-speed new MPU1 can increase the bus-access conflict rate.

Figure 7:
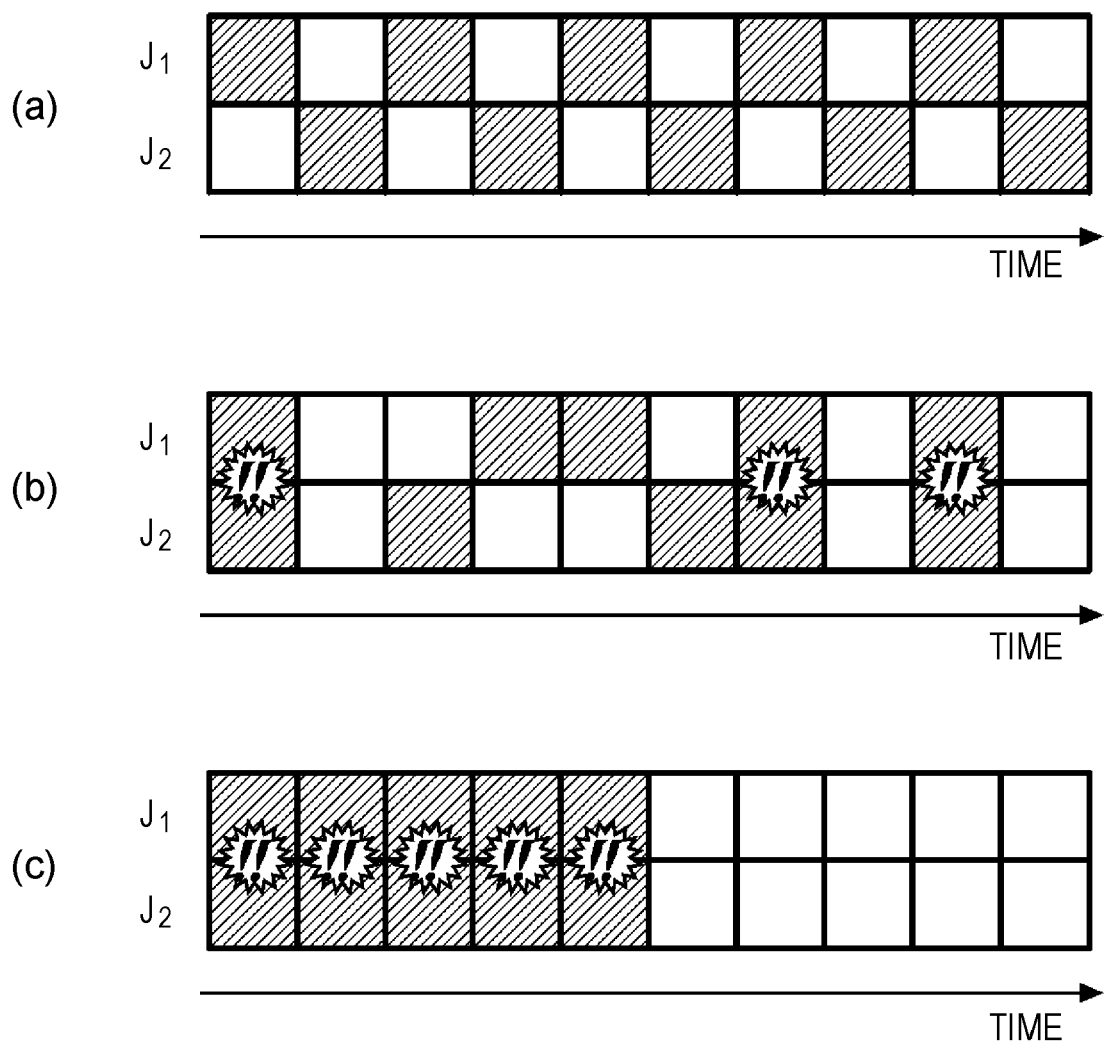
FIG. 7 is a diagram showing a typical scenario of memory accesses

FIG. 7 shows a typical scenario of memory accesses by two processors. $J_1$ is the job of one processor, and J2 is the job of the other processor. Here, assume that U1=U2=0.5 holds in either case.

FIG. 7(a) shows periodic accesses, which is the best case. In this case, no memory conflict occurs at all. FIG. 7(b) shows a moderate case in which random accesses are made uniformly. In this case, a memory conflict occurs sometimes. FIG. 7(c) shows cluster accesses, which is the worst case— they are non-uniform and correlated accesses, in which a memory conflict occurs everywhere. This method uses approximate calculation for the case in FIG. 7(b), and thus, an error occurs between simulation estimate and the actual behavior of the program in the other cases in FIGS. 7(a) and 7(c), in which the maximum error value is given. In other words, errors due to the approximation of this method fall within a limited range.

There has been no suitable simulation method that can deal with an execution trace and memory access conflict.

For example, a queuing network (QN) has excessively high abstractness and thus cannot obtain an execution trace. It is statistics that many performance modeling methods, such as QN, a stochastic automaton network (SAN), and a stochastic process algebra (SPA), generate.

Figure 8:
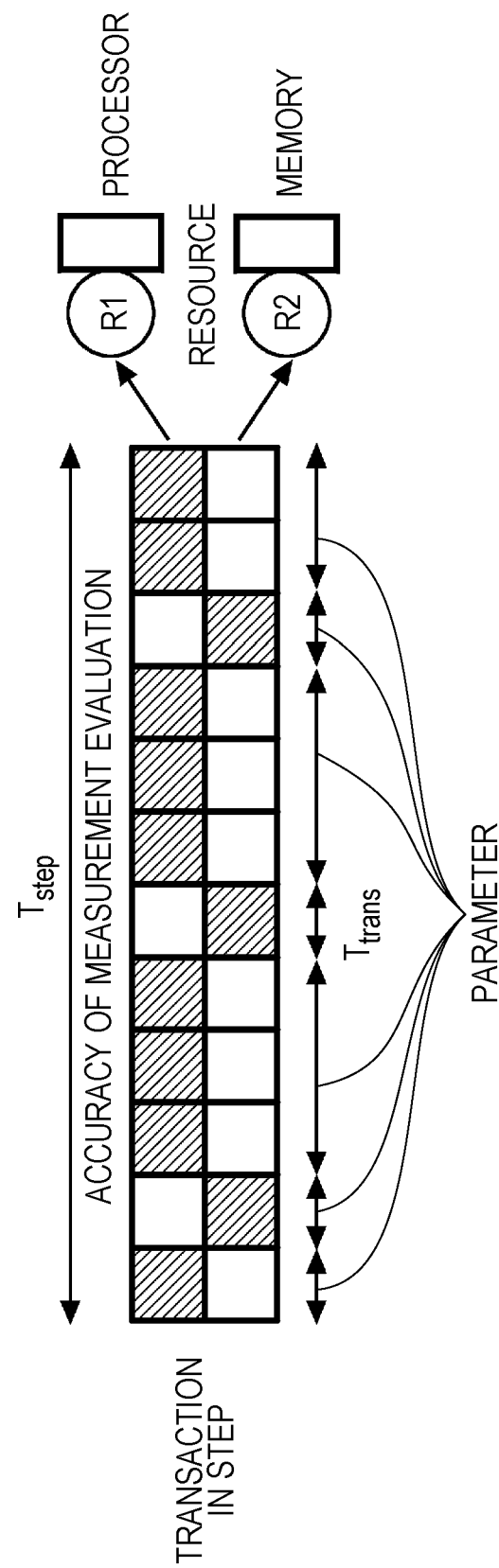
FIG. 8 is a diagram showing the relationship between parameters necessary for fine-grained simulation and a UML-level step.

On the other hand, transaction-level modeling is too fine that the simulation speed is low and the work load of the modeling is heavy. Furthermore, since $T_{step} \gg T_{trans}$ holds, as shown in FIG. 8, where $T_{trans}$ is a transaction time width, and $T_{step}$ is a simulation step, many parameters are needed because the time scale is separated.

Next, the comparison between conventional methods of evaluating the performance of a design model and the method for the present invention can be summarized in the table below.

Next, the UML-level design will be described. The intention of the designer is described at a UML step level as follows:

In UML behavior modeling, activity, state, or operation is the unit of the UML step.

Assume that transaction patterns in one step are uniform and at random. This is because the cycle of memory accesses in a loop can fluctuate due to branching.

Transaction patterns across steps can differ. This is because the intension of the design for each step can also differ.

A time-consuming step includes many transactions. In other words, $T_{step} \gg T_{trans}$, as described above. In a state in which memory access time is in question, this is equivalent to $N \gg 1$.

Since such time scale separation, $T_{step} \gg T_{trans}$, is present, behavior in the time scale $T_{trans}$ is statistically evaluated in one step. On the other hand, the behavior in time scale $T_{step}$ is simulated by an executable UML, where simulation time is supported (timed).

The three requirements, the speeds of individual resources, synchronous transaction of the resources, and conflict of the resources, described above, are evaluated as follows. First, the resource speeds will be described. The UML step is characterized by a resource use request for updating $T_{step}$. At that time the difference between the resource speeds of a system at measurement and a new system is reflected to $T_{step}$ using Amdahl's law expressed as the following equation:

$$T_{step}(\text{new}) = T_{step}(\text{ref.}) * (1-U+U/f)$$

where f is the speed ratio (speed factor) of the new resource to the reference resource, and U is the ratio of time for the resource to $T_{step}$ (ref.).

For a processor resource, $U=(1-N*L/T_{step}(\text{ref.}))$ where L is the latency of a memory access.

In the case where the latency differs between reading and writing, $U=(1-(Nr*Lr+Nw*Lw)/T_{step}$ (ref.)) holds, where Lr and Lw are the latencies thereof, and Nr and Nw are the numbers of accesses thereof, respectively.

TABLE 1

| | Development Phase | Abstract Level | Simulation Speed | Input | Output |
|---|---|---|---|---|---|
| Queuing Network Model | System level analysis | High | High/analytic | System request | Throughput, Resource utilization factor |
| Present Invention | UML level design | Intermediate | Intermediate | System architecture (HW/SW) | Throughput, Resource utilization factor, Execution trace |
| SystemC Transaction Model | Electronic system level design | Low | Low | Detailed design, Source code | Throughput, Resource utilization factor, Execution trace, Transaction trace |
| Instruction Set Simulation | Implement/unit testing | Very low | Very low | Binary code | All |

Here, the execution trace is defined again as the time and flow of each job, such as a page printing process, and the transaction level modeling is defined as a model with the same abstractness as that of the log of transaction between devices, such as a memory access. As shown in the table, the method for the present invention is characterized in that it can be suitably applied to a UML-level design model by moderating some of the existing methods.

For a memory resource, U is the utilization factor of the memory resource.

For a memory resource, a resource conflict is calculated from collision probability under the assumption that the distribution of the transactions is at random and uniform.

For a processor resource, a resource conflict is calculated under the assumption that the resources are shared by time slices or queues.

Furthermore, the effect of synchronous transaction is evaluated by a conflict propagation algorithm. The details will be described later with reference to FIG. 13.

Figure 9:
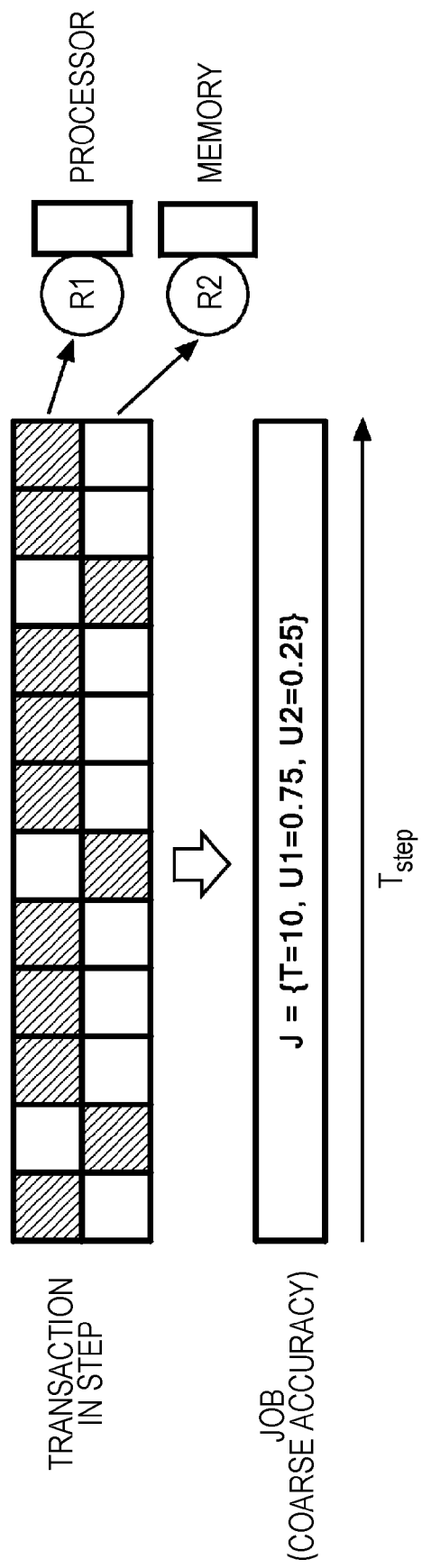
FIG. 9 is a diagram showing the relationship between resource accesses and utilization factor U in a UML model.

An example of the relationship between UML-step-based resource accesses and fine-grained resource accesses is shown in FIG. 9. As shown as a job, the resource conflict is evaluated at the rough level, $T_{step}$. Here, the resources include a memory and a device called a bus master, such as a processor, an accelerator, or a controller, that accesses the memory. Although a processor is described in the above, it is to be understood that the simulation method can also be applied to a bus master other than the processor in the same manner as to the processors.

Here, an object of application of the present invention to a UML-based model is as follows:

To verify the software and hardware architectures of a new product from the viewpoint of performance. The definition of performance metrics here is an application process execution time.

Expected output is as follows:

Resource utilization factor (bus and processor)

Step execution trace (start and end times of individual steps)

Requested here is as follows:

UML execution semantics (for example state machine or activity diagram) should be supported. This is satisfied by using a UML, as a base, that is executed such that simulation time is supported (timed).

Accurate simulation parameters should be used. This is satisfied by using a measuring technology and reverse modeling that is a technology for creating a model from an existing source code.

Evaluation of the following effects is needed as described above:

The speeds of individual resources

Synchronous transaction of the resources

Resource conflict

Since the technique of the present invention is designed for a UML-level execution trace, the simulation technique of the present invention can be integrated with a UML editor. In this case, three kinds of model are defined as follows:

An application model is a user model for software design having a stereotype to annotate performance parameters.

A resource assignment model describes the relationship between software components and platform resources using a MARTE allocation package. Here, the Modeling and Analysis of Real-Time & Embedded Systems (MARTE) is a domain-specified modeling language for real-time embedded systems defined as a UML-extension profile.

A platform model is a simulation framework composed of components that simulate the behaviors of a processor and a memory.

Figure 10:
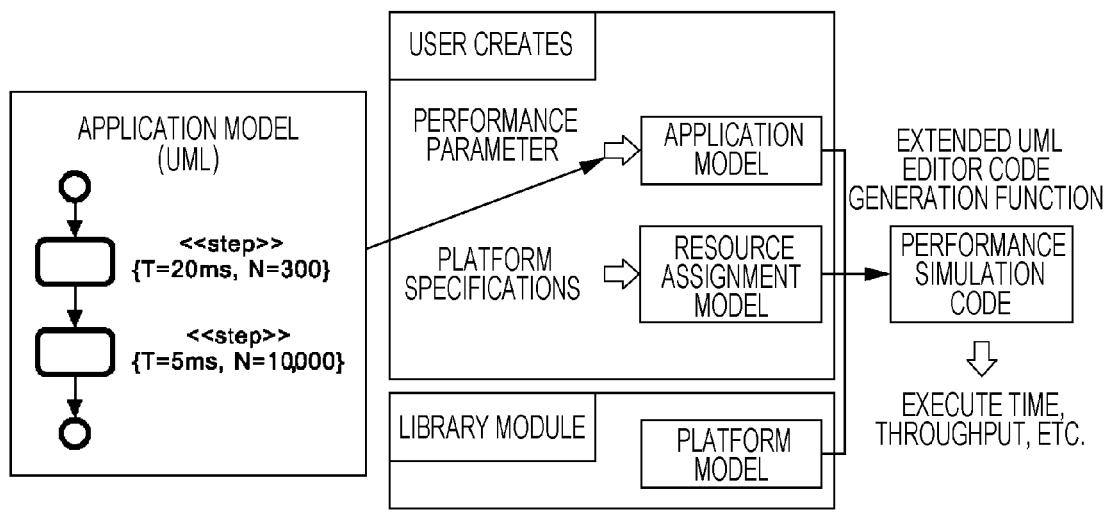
FIG. 10 is a schematic diagram showing the function of a UML editor.

FIG. 10 is a schematic diagram showing the function of such a UML editor. Specifically, a user creates an application model and designates a resource assignment model. Performance parameters are added to the application model, and platform specifications are set to the resource assignment model. In this case, for example, a UML-editor plug-in is used.

The application model and the resource assignment model are connected to a platform model including a library module to generate a performance simulation code. The code generation function is achieved, for example, by extending the existing code generation function of the UML editor. The performance simulation code is executed on a computer system different from the embedded system.

Typical information obtained by the simulation is an execution trace and the report of the utilization factors of the individual resources as the functions of time.

The execution trace can be used for the following purposes:

Understanding the behavior of the system through visualization

Evaluating the execution time under a test case

Calculating statistics such as throughput

The utilization factors of individual resources as functions of time can be used for the following purpose:

Identifying a bottleneck resource

Figure 11:
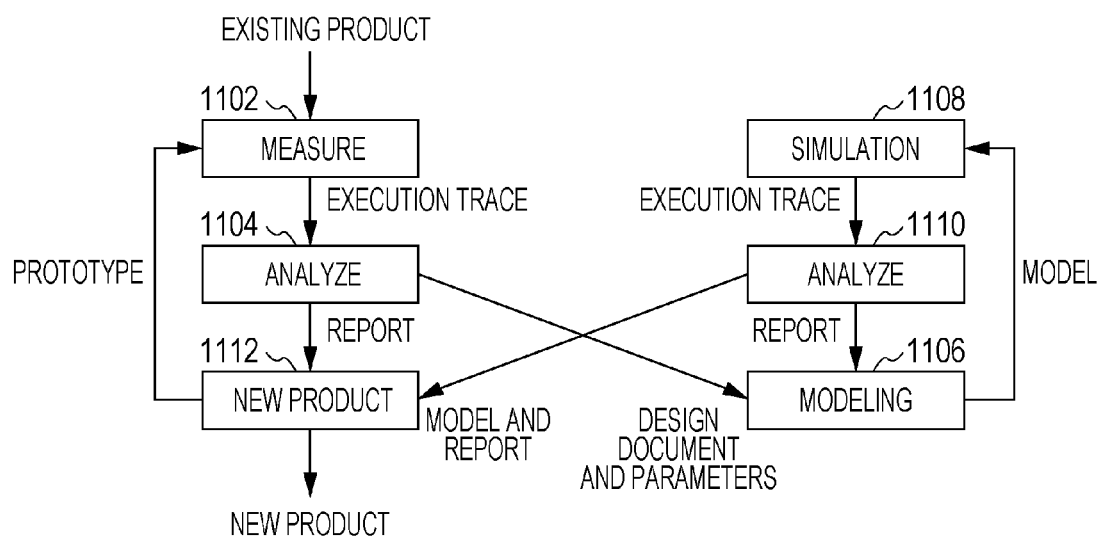
FIG. 11 is a diagram showing the procedure of a product development cycle.

FIG. 11 is a diagram illustrating the procedure of the process of designing a new product from an existing product. Specifically, the operation of the existing product is measured in step 1102, by which an execution trace is obtained.

In step 1104, the execution trace is analyzed, and modeling is performed in step 1106 on the basis of the analysis result. For the modeling, a design document and parameters are also referred to. In step 1108, a simulation is performed on the basis of a model obtained by modeling, by which an execution trace is obtained.

The execution trace is analyzed in step 1110, by which a report is created, and thus, modeling is performed again as necessary in step 1106 on the basis of the report.

When sufficient reports are thus obtained, design is performed in step 1112 on the basis of the model and the information of the reports. After the design, a prototype is created, and measurement is performed in step 1102.

If no satisfactory result can be obtained, the procedure returns to the modeling in step 1106. When a satisfactory design is obtained in step 1112 as the result of the series of steps, a new product is produced on the basis of it.

Next, an example of an annotated executable UML will be described as a simulation model. Specifically, step parameter description (application model) and assignment of memory and processor resources to the software components (resource assignment model) are added to the UML by applying a profile (that is, UML extension, such as the OMG MARTE profile).

The UML model is also used as a specification for software. Specifically, when implementing software, developers can use the UML model, or can automatically create a software source code from the model.

Figure 12:
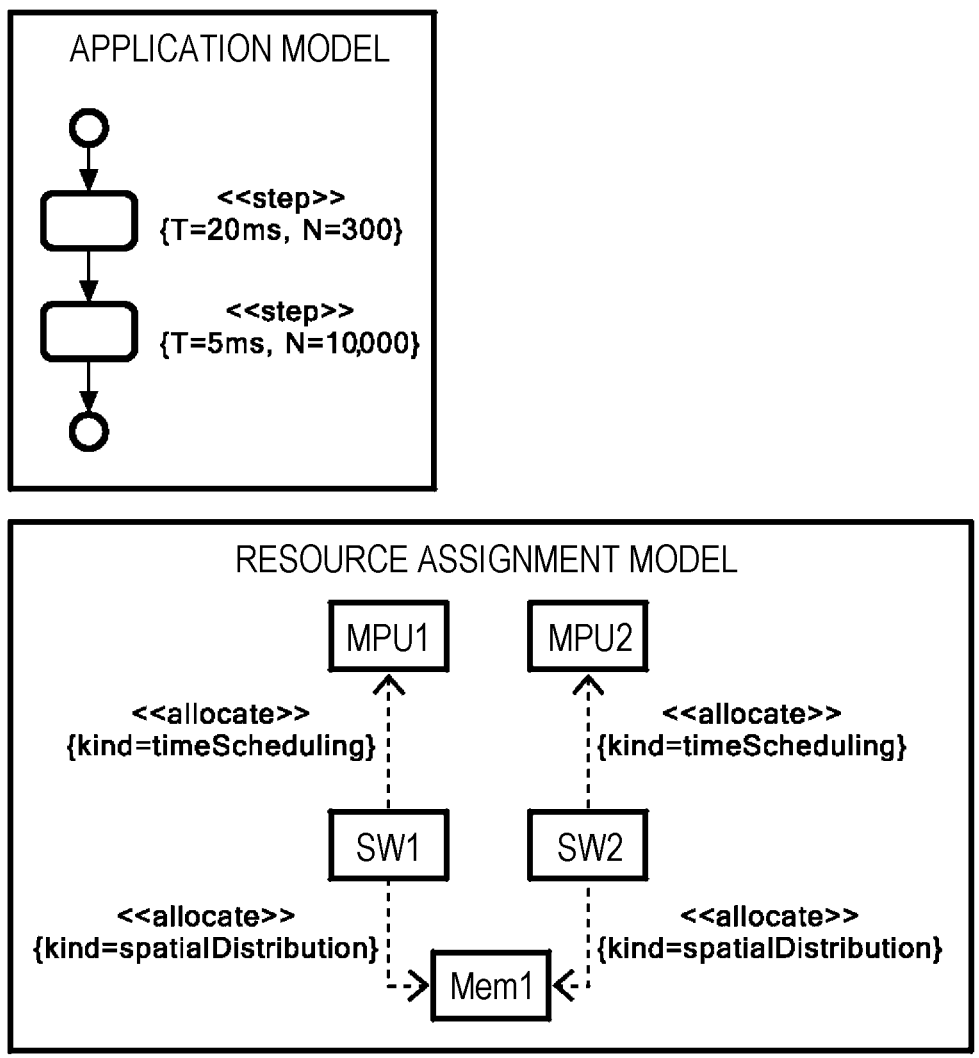
FIG. 12 is a diagram showing a UML input model.

FIG. 12 shows examples of such an application model and resource assignment model. In the drawing, << . . . >> indicates a stereotype defined by the profile. Signs SW1 and SW2 in the resource assignment model denote software components.

Note that an event-driven or discrete time simulation model of types other than the UML are also available for simulation.

The application-profile collection tool allows the execution time T and the number of memory accesses N to be measured without causing little disturbance to the system.

Step execution time T can be given by inserting a small code that notifies the step start/end detection module of the entry and exit of the steps (see, for example, Ohba, N., Takano, K.: Hardware debugging method based on signal transitions and transactions. In: Proceedings of the 11th Asia South Pacific Design Automation Conference (ASPDAC 2006)).

The number of memory accesses, N, is measured by counting the number of cache misses using cache emulator hardware.

Such information is reported as an execution trace, and model parameters can be extracted from the execution trace.

Before the description of this embodiment is continued, the definitions of terms will be given.

First, "step" corresponds to an action, state, or operation of the UML model. A step generates a job when executed.

"Job" is the unit of process of a resource, and corresponds to a step.

In this case, job $J=\{T_{step}, U_1, U_2, \ldots, U_m\}$, where m is the number of resources, $U_i$ is a utilization factor required for the $i_{th}$ resource by the job.

Job processing time is calculated from $T_{step}$ and the utilization factor thereof.

"Resource" is the abstract of hardware, such as a processor and a memory.

Each resource processes a job in accordance with the utilization factor thereof.

Each resource has a capacity, which is normalized to 1. In each resource, the sum of the utilization factors of the job does not exceed the capacity.

Each resource can change in the utilization factor of the job so that the sum of the utilization factors can be kept 1 or below (conflict state).

Each resource can change the utilization factor of the job in accordance with a speed factor.

Step Parameters: They are given from a reference system and is adjusted for a new system.

T: step time
Nr: the number of read accesses
Nw: the number of write accesses
Wr: the maximum number of read accesses available each unit time
Ww: the maximum number of write accesses available each unit time Job Parameters
T: processing time
Up: requested processor utilization factor
Ub: requested memory bandwidth utilization factor The relationship between the step parameters and the job parameters is as follows:

Job.$T$=Step.$T$ $Ub=(Nr/Wr)T+(Nw/Ww)/T$ $Up=1$

Figure 13:
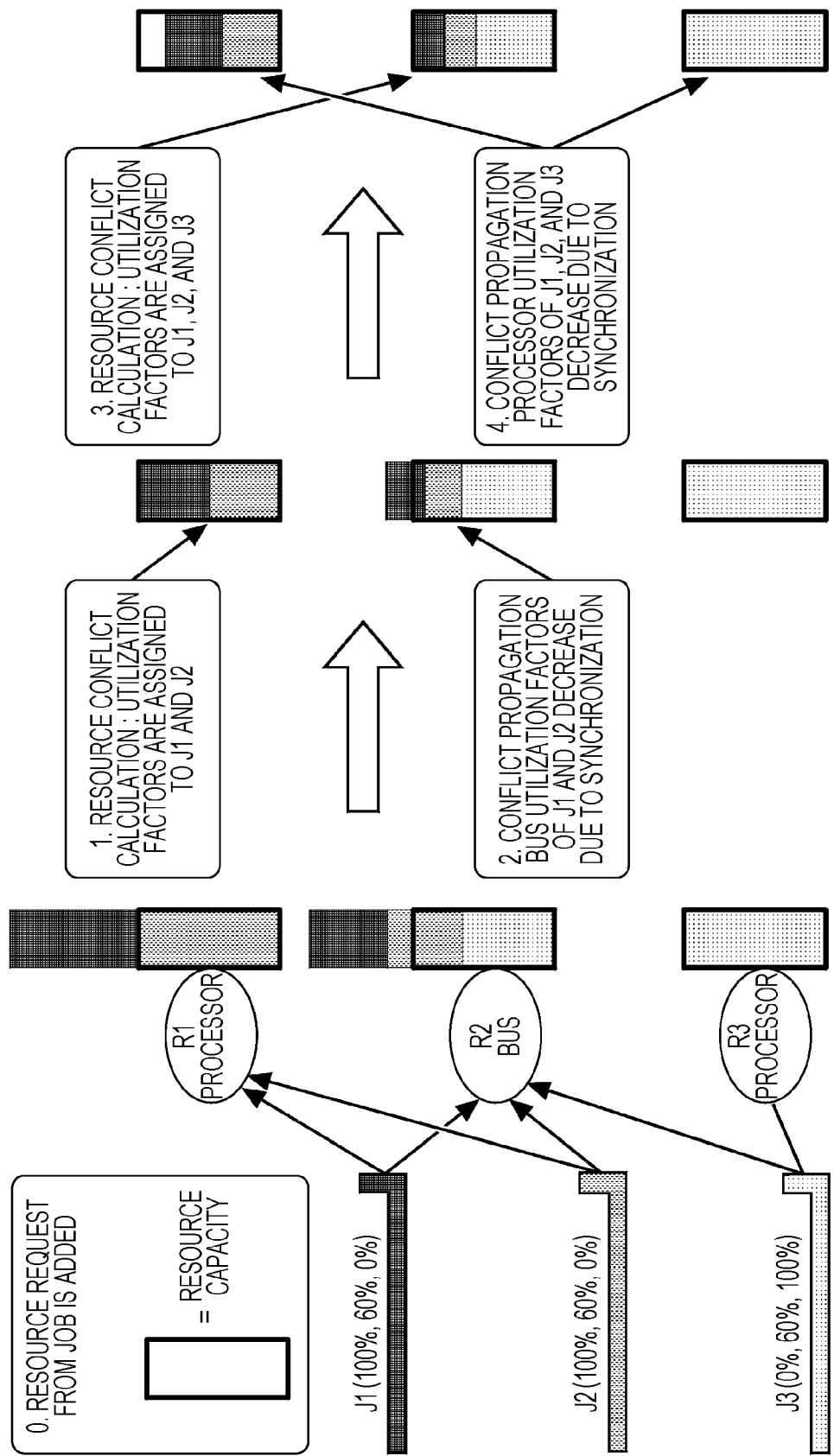
FIG. 13 is a diagram showing an example of calculation of a resource utilization factor.

FIG. 13 is a diagram showing an example of calculation of a utilization factor. In this diagram, assume that there is a processor, which is a resource R1, a bus, which is a resource R2, and a processor, which is a resource R3. Assume that the utilization factors of job J1 are (R1, R2, and R3)=(100%, 60%, and 0%), the utilization factors of job J2 are (R1, R2, and R3)=(100%, 60%, and 0%), and the utilization factors of job J3 are (R1, R2, and R3)=(0%, 60%, and 100%). Then, resource conflicts occur apparently; however, the number of conflicts is reduced because the utilization factors are calculated, and the conflict propagates.

Figure 14:
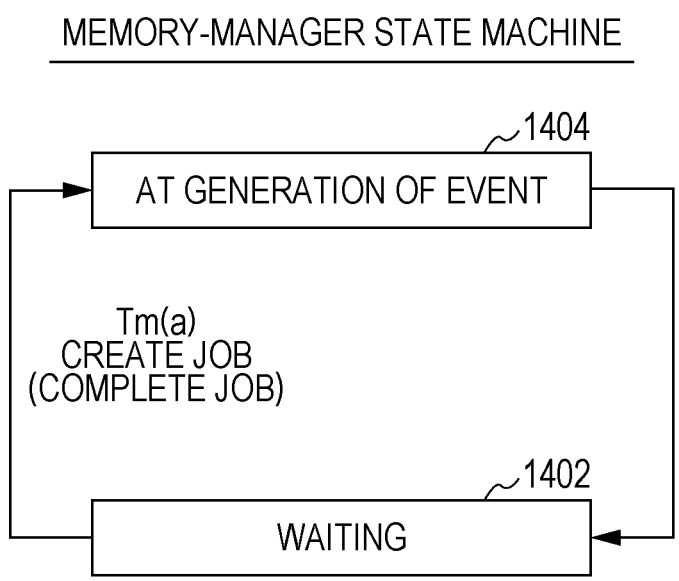
FIG. 14 is a diagram showing a state machine of a resource manager.

Referring next to FIG. 14, the overall simulation method for this embodiment will be described.

Data left$_i$(t) is defined as the remaining amount of resource accesses that a job has at time t.

Data left$_i$(0)=T*$U_i$(0) is the initial value when the job is generated.

1. Calculate the job utilization factors U of all the resources (a utilization factor calculation algorithm will be described later).

2. Update the job completion times of all the jobs using the following equation:

$\Delta T_i$=Data left$_i$(t)/$U_i$(this value does not depend on the resource.)

3. Find the minimum time of each of job completion times of all the jobs. In other words, the minimum value of $\Delta T_i$ of the job is set to a.

4. Wait for time-out
Tm(a): during which a job start event can occur at t'<t+a. Tm(a) indicates waiting for a time-out of a seconds. When a time-out occurs, the present simulation time t is updated to t+a.

5. Subtract U*(t'−t) from Data left$_i$(0) for all the jobs.

6. If Data left$_i$(t+a)=0, the job is removed, and a job completion event is sent.

FIG. 14 shows a resource-manager state machine corresponding to the above process. In FIG. 14, state 1402 includes waiting, updating the utilization factors of all the jobs, updating $\Delta T$ of all the jobs, and finding a, which is the minimum $\Delta T$.

On the other hand, state 1404 includes updating Data left and removing completed jobs.

Next, the utilization factor calculation algorithm will be described.

Figure 4:
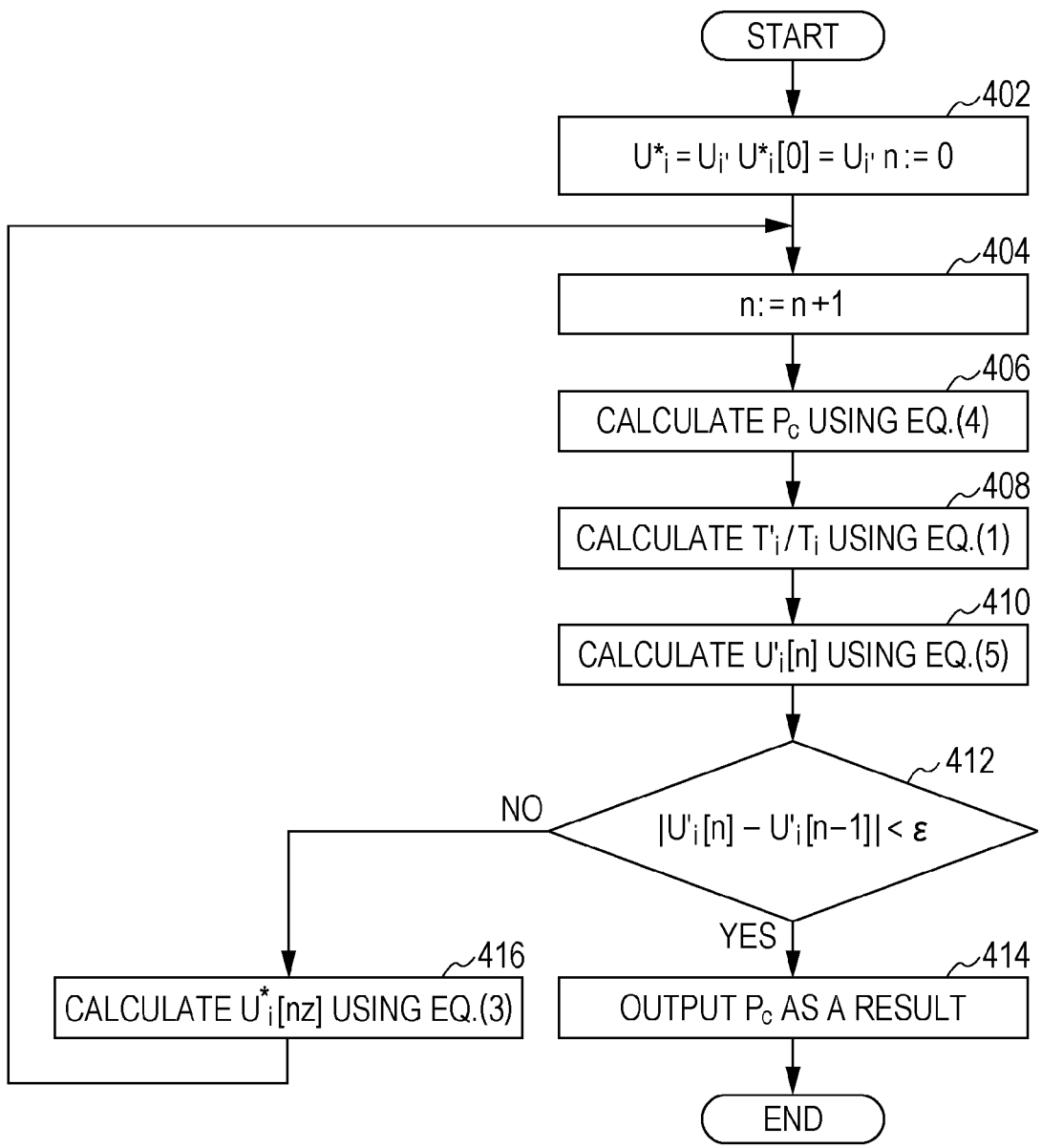
FIG. 4 is a diagram showing a flowchart for a performance calculation process according to the present invention.

First, for a memory bandwidth resource, the memory access conflict calculation technique, which is described with reference to FIG. 4, is used.

In the case of a processor resource, for a non-preemptive multitask system, for example, a queuing model is used. On the other hand, for a preemptive multitask system, for example, the following simple proportional utilization factor assignment is used.

[Formula 10]

$$J_i Up' = \frac{J_i Up}{\sum_k J_k Up}$$

Next, the effect of resource conflict propagation to other resources will be described. As shown in FIG. 13, if the utilization factor of a resource for a job decreases due to conflict, the utilization factors of the other resources for the job decrease due to the synchronism thereof.

Similar propagation is described as follows:

When $U_i'=fU_i$, $U_h'=fU_h$ holds for h which is not equal to i, (This is because $T'U_h'=TU_h$ holds and time extends as $T'U_i'=TU_i$.)

The order of calculations of resource conflicts influences on the distribution of job utilization factors because of conflict propagation. Thus, an explicit device-based calculation order is started from a high privileged resource.

For example, the utilization factor of a processor resource is calculated first.
The result is propagated to the other resources.
The utilization factor of a memory resource is calculated next.
The result is propagated to the other resources.

Although the resource utilization factor calculation process has been described as a function to be added to the UML editor, the present invention is not limited thereto. It can be applied to performance evaluation of any executable program.

Furthermore, it should be understood by those skilled in the art that the present invention is not limited by a platform and a programming language processing system used.

REFERENCE SIGNS LIST

310: reference embedded system
312: application
314: platform
316: memory-access detection module
318: step start/end detection module
320: modeling/simulation system
322: model (UML) editor
324: calculation module
330: measurement module

The invention claimed is:

1. A method for evaluating a probability of memory access conflict of different bus masters while a program expressed in a simulation model is in operation, in a heterogeneous system in which the different bus masters include a processor, an accelerator, and a controller that can access a memory, the method comprising the steps of:
measuring, for the simulation model, an execution time and a number of memory accesses for each simulation step for each of the different bus masters of the heterogeneous system or preparing measurement values in advance;
determining a processor utilization factor for each of the different bus masters of the heterogeneous system;
calculating a utilization factor of a memory bandwidth for each of the different bus masters of the heterogeneous system using the execution time and the number of memory accesses; and
calculating the probability of memory access conflict among the different bus masters of the heterogeneous system using a formula including the processor utilization factor and the product of the utilization factors of the memory bandwidths of the different bus masters;
wherein a UML-based model simulation is used to calculate the utilization factor of the memory bandwidth and the processor utilization factor.

2. The method according to claim 1, further comprising evaluating the execution time as a result of memory access conflict on the basis of the calculated probability of memory access conflict.

3. The method according to claim 1, wherein
the utilization factor U of the memory bandwidth of each simulation step is calculated using $U=(Nr/Wr)T+(Nw/Ww)/T$, wherein T is a step time,
Nr is a number of read accesses,
Nw is a number of write accesses,
Wr is a maximum number of read accesses available each unit time,
Ww is a maximum number of write accesses available each unit time.

4. A computer readable article of manufacture tangibly embodying non-transitory computer readable instructions which, when executed, cause a computer to carry out the steps of a method for evaluating a probability of memory access conflict of different bus masters while a program expressed in a simulation model is in operation, in a heterogeneous system in which the different bus masters include a processor, an accelerator, and a controller that can access a memory, the method comprising the steps of:
measuring, for the simulation model, an execution time and a number of memory accesses for each simulation step for each of the different bus masters of the heterogeneous system or preparing measurement values in advance;
determining a processor utilization factor for each of the different bus masters of the heterogeneous system;
calculating an utilization factor of a memory bandwidth for each of the different bus masters of the heterogeneous system using the values of execution time and the number of memory accesses; and
calculating the probability of memory access conflict among the different bus masters using a formula including the processor utilization factor and the product of the utilization factors of the memory bandwidths of the different bus masters;
wherein a UML-based model simulation is used to calculate the utilization factor of the memory bandwidth and the processor utilization facto.

5. The article of manufacture according to claim 4, further comprising evaluating the execution time as a result of memory access conflict on the basis of the calculated probability of memory access conflict.

6. The article of manufacture according to claim 4, wherein the utilization factor U of the memory bandwidth of each simulation step is calculated using:

$U=(Nr/Wr)T+(Nw/Ww)/T$, wherein

T is a step time,
Nr is a number of read accesses,
Nw is a number of write accesses,
Wr is a maximum number of read accesses available each unit time,
Ww is a maximum number of write accesses available each unit time.

7. A computer modeling system for simulating the performance of a reference embedded system, wherein the reference embedded system includes an application, a platform having a processor and a memory for executing the application, a memory-access detection module, and a step start/end detection module, the computer modeling system comprising:
a measurement module communicatively coupled to the memory-access detection module and the step start/end detection module;
a model editor communicatively coupled to the measurement module; and
a calculation module communicatively coupled to the measurement module and the model editor;
wherein the calculation module is configured to perform calculations on the basis of data output from the memory-access detection module and the step start/end detection module;
wherein the reference embedded system is a heterogeneous system; and
wherein the model editor is UML-based.

* * * * *